Jan. 31, 1967   R. E. JACKSON ET AL   3,300,854
METHOD OF MAKING REFRACTORY METAL STRUCTURES WITH
AN OXIDATION RESISTANT COATING
Filed May 14, 1964
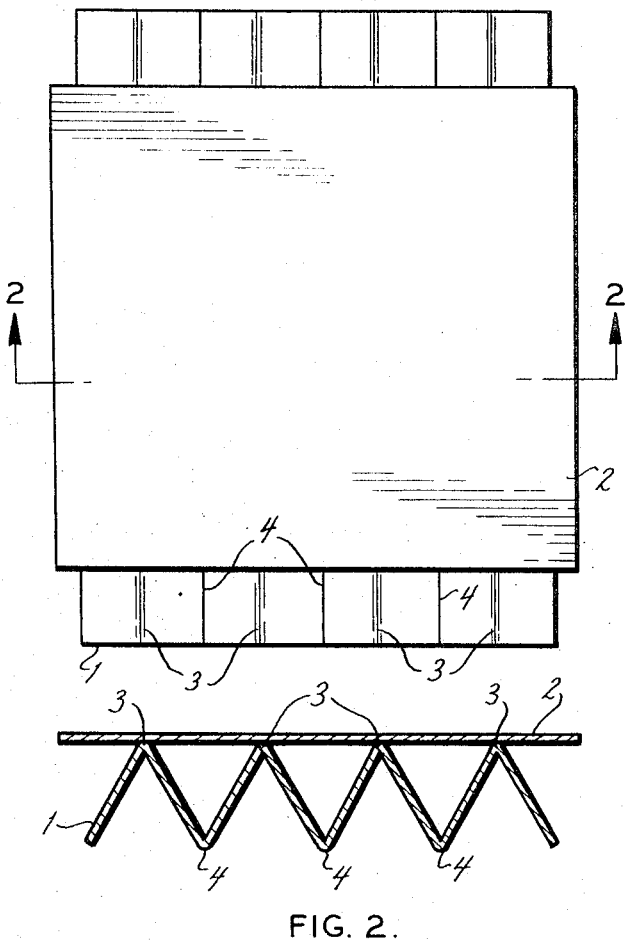
FIG. 1.
FIG. 2.
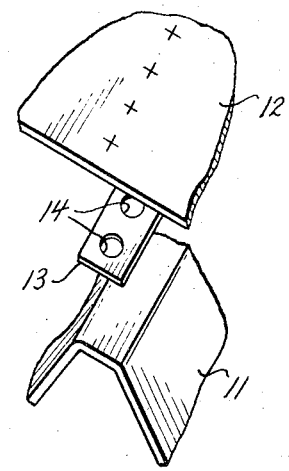
FIG. 3.
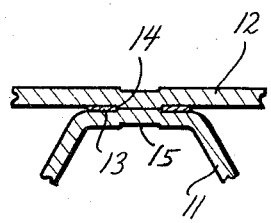
FIG. 4.
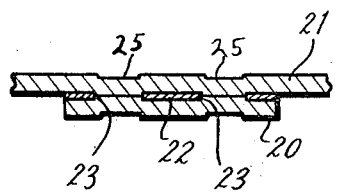
FIG. 5.
INVENTORS
ROBERT E. JACKSON
JOHN D. CULP
BY Gravely, Lieder & Woodruff
ATTORNEYS United States Patent Office 3,300,854
Patented Jan. 31, 1967

3,300,854
METHOD OF MAKING REFRACTORY METAL STRUCTURES WITH AN OXIDATION RESISTANT COATING
Robert E. Jackson, Godfrey, Ill., and John D. Culp, Hazelwood, Mo., assignors to McDonnell Aircraft, St. Louis, Mo., a corporation of Maryland
Filed May 14, 1964, Ser. No. 367,308
8 Claims. (Cl. 29—527)

This invention relates to methods of protecting surfaces of refractory metals from deterioration at high temperature and more particularly to the protection of faying surfaces of refractory metal structures. More specifically, the invention relates to protecting the refractory metals such as columbium, molybdenum, tantalum, tungsten, etc. from high temperature deterioration and in particular structures of such refractory metals having faying surfaces.

One of the most difficult refractory metal surface areas to protect from high temperature deterioration are faying surfaces (surface in intimate contact with other surfaces). Usually such surfaces require costly treatments to acquire a coating resistant to high temperature deterioration. In various structures such as encountered in fabricating aerospace vehicles, it is often necessary to have inaccessible faying surfaces or surfaces making contact with other surfaces. Frequently, such faying or contacting surfaces are necessary in aerospace vehicles where the skin or aerodynamic surface is supported from a corrugation, such as a honey-comb structure, or similar design. The high temperature deterioration becomes critical when refractory metals are required to withstand the extreme temperatures at which such vehicles must function.

The invention herein avoids the problems of faying surfaces deterioration resulting from lack of appropriate surface protection in the immediate vicinity of such contacting areas of refractory metals by providing a minimum contacting or faying surface and a coating which reacts with the refractory metals to produce the desired surface protection.

It is therefore an important object of the invention to provide refractory metal structures which have a minimum area of faying surfaces and contain a high temperature resistant coating over the surface thereof.

It is another object of the invention to provide a refractory metal structure having a minimum of faying surfaces and an oxidation resistant coating over all surfaces of the structure.

It is another object of the invention to provide a method of applying protective coatings to refractory metals in which the structure is assembled with a minimum of inaccessible area, and coating the surfaces of the structure with a protective coating.

A further object of the invention is to provide a method of protecting refractory metal structures by fabricating the structures with seam welding along a minimum faying surface area, minimizing blind crevices, and then exposing the surfaces of the structure to a coating process, compatible with the refractory material, that affords high temperature deterioration resistance to the structure.

It is another object of the invention to provide a method of protecting refractory metal structures by processing the structures with a minimum of faying surfaces, the construction including the process of positioning a metal foil intermediate to the refractory metal parts to be joined by welding techniques in which the foil has a cutout solely in the area to be welded, welding the surfaces together and processing the parts through a heat treatment to convert the foil into a protective coating on the surfaces of said refractory metals and thereafter immersing the welded structure in a slurry adapted to deposit a protective material about the remaining surfaces of said structure.

It is another object of the invention to provide a method of protecting columbium structures having faying surfaces by providing an aluminum alloy foil interlayer between faying surfaces of the columbium material during fabrication and thereafter treating the columbium structures containing the aluminum alloy foil in the faying surfaces to a slurry of aluminum and thereafter heat treating the columbium structure to completely aluminide such structure.

It is a further object of the invention to provide a method of protecting refractory metal structures by treating the parts of the structure with a slurry of material, suitable under heat treatment to convert the surface of the structure to an oxidation resistant composition, positioning a metal foil intermediate the refractory metal parts to be joined by welding techniques in which the foil has a cutout in the area to be welded, then welding the structure together and dipping the welded structure into the slurry, and then heat treating the entire structure to produce the protective composition thereon.

It is still another object of the invention to provide a method of protecting refractory metal structures by providing an intermedaite metal foil surrounding faying areas of the structure being welded and welding the parts, treating the welded structure with a slurry of the metal of the metal foil, and thereafter heat treating the entire structure to produce the desired high temperature surface protection.

These and other objects and advantages of the invention will be readily apparent to those skilled in the art from the preceding description in conjunction with the claims and the drawings in which, FIG. 1 is a top view of a refractory metal structure having a minimum faying surface;

FIG. 2 is a cross sectional view taken along line 2—2 in FIG. 1 exhimiting a minimum faying surface of the structure;

FIG. 3 is an exploded, perspective view illustrating an intermediate foil between two refractory metal surfaces forming a refractory structure;

FIG. 4 is a cross sectional view illustrating the completed spot welded structure, and FIG. 5 is a cross sectional view illustrating another spot welded construction.

Referring specifically to FIG. 1 and FIG. 2, there is depicted a corrugation 1 and a skin 2. The corrugation 1 has sharp edges 3 which contact skin 2. The edges 3 are sharp to reduce the amount of faying surface between corrugation 1 and skin 2. The edges 4 of corrugation 1 may be of any desired shape and do not require the preferred sharp construction of edges 3. The edges 3 are attached to the underside of skin 2 as viewed in FIG. 2 preferably by electron beam welding, but may be resistance seam welded. With structures having such construction as illustrated, the technique of providing a high temperature resistant surface coating is simplified. Many techniques are known for protecting refractory metals. U.S. Patent No. 2,763,921 granted to P. P. Turner, Jr., et al. September 25, 1956, discloses a spray coating process for molybdenum. A technique for providing diffusion coatings on refractory metal is disclosed in U.S. Patent 3,037,883 entitled "Diffusion Coating of Non-Ferrous Metals" granted June 5, 1962 to R. L. Wachtell et al.

Referring now specifically to FIGS. 3 and 4, there is illustrated a preferred technique for protecting faying surfaces of refractory metals. In FIG. 3 a corrugation 11 of refractory metal is to be spot welded to a refractory metal skin or plate 12 in locations noted with an X. An alloy plate or foil 13 having circular cutouts 14 is positioned intermediate corrugation 11 and plate 12. The corrugation 11 and plate 12 are spot welded together through cutouts 14. With reference to FIG. 4 spot welds 15 may be observed which connect plate 12 to corrugation 11 through alloy foil 13 in areas 14.

Typically a columbium alloy sheet formed into corrugation 11 is joined to a columbium alloy sheet as skin 12 using an aluminum alloy sheet as foil 13. After the spot welding, the columbium structure with the aluminum foil interlayer is run through a heat treating cycle which causes the aluminum to react with the columbium forming an aluminide on the columbium refractory metal.

With reference to FIG. 5, another illustrative embodiment of the invention includes a doubler or stiffener 20 for a sheet metal plate 21. The doubler 20 and plate 21 are made of refractory material, for example columbium. Between doubler 20 and plate 21, an alloy plate or foil 22 with apertures or cutouts 23 is provided. The foil may be aluminum if columbium is used as the refractory metal, or any suitable material to provide appropriate protection. The doubler 20 is welded to plate 21 through apertures 23 in foil 22 by spot welds 25. Heat treatment, similar to that disclosed above, is performed to cause a reaction of the foil 22 and refractory materials 20 and 21 forming a protecting oxidation resistant coating.

Although several techniques have been described for producing a minimum amount of faying surface in refractory metal structures and providing oxidation resistance coatings to the refractory metals, various other coatings can be produced to afford the complete protection required in refractory metal structures which include faying surfaces.

In a specific example, a columbium alloy sheet and a columbium alloy corrugation were assembled in accordance with the invention. First an aluminum foil in the neighborhood of 10 mils thickness was cut to produce a pattern of circular openings therethrough. The cut foil was then placed on the columbium corrugated structure and the columbium alloy sheet was positioned over the foil with spot weld orientations to areas where the aluminum foil was cut away. The columbium sheet was then spot welded to the columbium corrugated panel, and then cleaned and pickled by well known techniques. Next the entire structure was immersed in a slurry containing an aluminum alloy paste of the following composition:

88 percent aluminum
10 percent chromium
2 percent silicon

This aluminum alloy paste may be procured from Reynolds Metals Company (Richmond, Virginia) under the trade name LS–866. The aluminum alloy paste was mixed in proportion of aluminum alloy 125 parts by weight, xylene 75 parts by weight, acetone 50 parts by weight and Bentone 34 1.5 parts by weight. The Bentone 34 is not an essential component of the slurry, and in fact other compositions using materials other than xylene and acetone likewise could be used. The aluminum alloy paste is less than 100 mesh (U.S. Standard Screen Sieve).

The slurry is maintained within an appropriate vessel of stainless steel to permit evacuating the slurry tank to a pressure of 5 p.s.i. The parts were lowered into the slurry and completely submerged being careful to avoid any air entrapment. After the structure was completely immersed in the slurry, the pressure in the slurry tank was reduced to about 5 p.s.i.a. and maintained at that pressure for a minute and a half. The pressure was returned to atmospheric with the non-oxidizing gas argon (others such as helium, nitrogen, etc. could be used) and the structure was removed from the slurry at a relatively uniform rate. The item was then dried for about an hour in an air circulating oven maintained at a temperature of about 120° F. After the hour drying the part was re-immersed in the slurry as heretofore mentioned but the pressure was not reduced. The slurry coated part was removed and then air dried for about 4 hours.

The part was then ready for the diffusion heat treatment in a high temperature retort. The structure was positioned conveniently in the retort utilizing tantulum wire screen for retention within the desired area of the retort. Any portions of tantulum which would touch the columbium was brush coated with the aluminum slurry heretofore described. After placing the structure in the retort, the pressure in the retort was reduced to approximately 4 to 7 p.s.i.a. and checked for leaks. Then the retort was back filled with purified (−85° F. dew point) argon to about 1–2 p.s.i.g. and checked for leaks. Next the retort was argon purged for 30 minutes.

After the retort has been argon purged for 30 minutes, the argon flow rate into the retort was maintained sufficient to replace the retort argon volume 2½ times per hour. The retort was placed in the furnace and the temperature was raised to 200° F. and held for 30 minutes. Next the temperature was increased to 350° F. and held for an additional 30 minutes. Thereafter, the furnace temperature was increased to 500° F. and held for 30 minutes and finally raised to 1900° F. at a maximum temperature rate increase of 700° F. per hour and maintained at the 1900° F. for one hour. After the one hour heating at 1900° the retort was removed from the furnace and cooled to 500° F. with the argon gas flow being maintained. After cooling, the argon gas flow was stopped and the structure was removed from the retort. The excess slurry on the part was removed by using a bristle type brush and water. The construction was then air dried with a high pressure air stream (50 to 70 p.s.i.).

Although in the specific example columbium was used with aluminum alloy and an aluminum alloy slurry to produce the corrugated panel appertaining to the invention, it will be appreciated that other refractory metals such as molybdenum, tantalum, tungsten, etc. may be utilized. Of course, the structures require compatible foil for the intermediate regions around spot welds and for forming the structure coating under heat treatment to produce the desired high temperature resistance. Also, spot welding, resistance welding and other types of joining procedures such as the electron beam welding may be utilized apart or in conjunction with the intermediate protective material foil appertaining to the invention.

From the foregoing it will be appreciated by those in the art that various modifications and changes to the invention may be made and such changes and modifications are deemed to be within the scope of the invention which is necessarily limited solely by the appended claims.

What is claimed is:

1. In a method of protecting refractory metal structures including the step of treating the component parts of the structure with a slurry of material suitable under heat treating conditions to convert the surface of the structure to an oxidation resistant composition, the steps of positioning a metal foil intermediate the refractory metal parts before joining such parts, the foil having openings in predetermined areas to permit junctures between the refractory metal parts, joining the refractory metal parts, treating the structure so joined with said slurry of material and then heat treating the entire structure to produce an oxidation resistant composition over the entire surface of said refractory metal structure.

2. A method of protecting a columbium structure comprising the steps of providing a perforated aluminum foil intermediate adjacent areas of components of the structure undergoing fabrication, joining the adjacent component parts to each other through the perforations, treating the completed structure of columbium with a slurry of aluminum and thereafter heat treating the structure to produce columbium aluminide over the entire surface of the structure.

3. A method of protecting a columbium structure comprising the steps of providing a perforated aluminum foil in the faying areas of the structure undergoing fabrication, joining the adjacent components parts to each other through the perforations, treating the completed structure of columbium with a slurry of aluminum and heat treating the completed structure in the program steps of heating the columbium structure in an inert atmosphere for 30 minutes at 200° F., at 350° F. for 30 minutes, at 500° F. for 30 minutes, and progressing to 1900° F. at a maximum temperature rate increase of 700° F. per hour, maintaining said 1900° F. temperature for an hour.

4. A method of protecting refractory metal structures comprising the steps of positioning a metal foil intermediate component parts of the refractory metal structure around the area of the juncture between said component parts, forming said juncture of the refractory metals and thereafter heat treating the refractory metal structure to convert the foil into a protective coating composition between the faying surfaces of the refractory metal structure, thereafter immersing the joined structure in a slurry of the foil metal adapted to produce a protective compound on said structure when heat treated, and again heat treating said structure to convert said slurry to said protective compound.

5. A method of treating refractory metal structures comprising the steps of forming component parts of the structure with a minimum surface in areas to be junctures between the parts, providing an intermediate metal layer surrounding the junctures of the structure, forming said junctures between said parts, immersing the fabricated structure in a slurry of the metal of the metal layer and reacting such metal with the refractory metal surface to create an outer surface composition of the refractory metal resistant to deterioration at high temperature.

6. The method of claim 5 wherein the refractory metal is columbium and the intermediate metal layer is aluminum.

7. The method of claim 5 wherein the refractory metal is selected from the group consisting of columbium, molybdenum, tantalum, and tungsten, and the metal layer is a metal compatible and reactive with the refractory metal to form a high temperature deterioration resisting surface on said refractory metal.

8. The method of forming a refractory metal structure resistant to deterioration at high temperature comprising the steps of forming component parts for the refractory metal structure with a minimum of surface in areas for junctures, positioning a metal foil intermediate the refractory metal component parts encircling the junctures areas, the metal foil being a material reactive with the refractory metal to produce an outer surface region of the refractory structure which is resistant to high temperature deterioration, fabricating the refractory metary structure, exposing the refractory metal structure to a slurry containing the metal of the metal foil and thereafter heat treating the entire structure to cause the metal of the metal foil to react with the outer surfaces of the refractory metal structures producing the high temperature resistant coating.

References Cited by the Examiner
UNITED STATES PATENTS

| | | | |
|---|---|---|---|
| 2,319,455 | 5/1943 | Hardman et al. | 29—475 |
| 2,583,575 | 1/1952 | Casson | 219—91 |
| 3,061,462 | 10/1962 | Samuel | 117—131 |
| 3,078,554 | 2/1963 | Carlson | 117—131 |
| 3,081,530 | 3/1963 | Wlodek | 29—527 |
| 3,206,847 | 9/1965 | Keeleric | 29—480 |
| 3,216,806 | 11/1965 | Sama et al. | 29—194 |

JOHN F. CAMPBELL, *Primary Examiner.*

P. M. COHEN, *Assistant Examiner.*